(12) United States Patent
Parisian

(10) Patent No.: US 12,263,820 B2
(45) Date of Patent: Apr. 1, 2025

(54) EXCESSIVE TRAIN BRAKE PIPE FLOW DIAGNOSTICS

(71) Applicant: NEW YORK AIR BRAKE, LLC, Watertown, NY (US)

(72) Inventor: Michael L. Parisian, Dexter, NY (US)

(73) Assignee: NEW YORK AIR BRAKE, LLC, Watertown, NY (US)

( * ) Notice: Subject to any disclaimer, the term of this patent is extended or adjusted under 35 U.S.C. 154(b) by 26 days.

(21) Appl. No.: 18/018,781

(22) PCT Filed: Jul. 29, 2021

(86) PCT No.: PCT/US2021/043591
§ 371 (c)(1),
(2) Date: Jan. 30, 2023

(87) PCT Pub. No.: WO2022/026635
PCT Pub. Date: Feb. 3, 2022

(65) Prior Publication Data
US 2024/0262327 A1    Aug. 8, 2024

Related U.S. Application Data

(60) Provisional application No. 63/059,371, filed on Jul. 31, 2020.

(51) Int. Cl.
*B60T 13/66* (2006.01)
*B60T 17/22* (2006.01)

(52) U.S. Cl.
CPC .......... *B60T 13/662* (2013.01); *B60T 17/228* (2013.01)

(58) Field of Classification Search
CPC ............................ B60T 13/662; B60T 17/228
See application file for complete search history.

(56) References Cited

U.S. PATENT DOCUMENTS

| 6,067,485 A | 5/2000 | Balukin | |
|---|---|---|---|
| 9,670,904 B2* | 6/2017 | Warfen | B60T 8/5031 |
| 2007/0236078 A1* | 10/2007 | Smith | B60T 13/665 303/7 |

(Continued)

OTHER PUBLICATIONS

AU Examination Report No. 1, Application No. 2021315565, dated Feb. 20, 2024, pp. 1-5.

(Continued)

*Primary Examiner* — George C Jin
(74) *Attorney, Agent, or Firm* — David L. Nocilly; Bond Schoeneck & King, PLLC

(57) ABSTRACT

A brake pipe pressure monitoring system evaluates the flow of pressure in the brake pipe and alerts the train driver when the brake pipe flow indicates a brake system failure. The system has a brake pipe pressure module coupled to computer controlled brake as well as to a brake pipe pressure transducer, a main reservoir pressure transducer, and a flow transducer that determines the amount of pressure flow from the main reservoir to the brake pipe. The brake pipe pressure module is programmed to calculated and track the flow in the brake pipe over time and to determine whether the flow in the brake pipe over time exceeds a predetermined threshold. In the even that flow exceeds the predetermined threshold, the computer controlled brake is signaled to alert the train driver of the failure condition.

12 Claims, 4 Drawing Sheets

(56) References Cited

U.S. PATENT DOCUMENTS

| | | | |
|---|---|---|---|
| 2008/0236959 A1* | 10/2008 | Hashida | B60T 8/4077 |
| | | | 188/72.2 |
| 2009/0223760 A1 | 9/2009 | Smith | |
| 2013/0297163 A1 | 11/2013 | Kull | |
| 2016/0221561 A1* | 8/2016 | Leroy | B60T 17/02 |
| 2016/0318497 A1* | 11/2016 | Wright | B60T 17/228 |
| 2018/0208220 A1* | 7/2018 | Wright | B61H 11/08 |
| 2020/0039479 A1* | 2/2020 | Volkmar | B60T 1/065 |
| 2020/0384974 A1* | 12/2020 | Call | B60T 17/228 |
| 2024/0359669 A1* | 10/2024 | Zhang | B60T 13/686 |

OTHER PUBLICATIONS

International Search Report and Written Opinion of PCT/US2021/043591. Mailing date of Search Report, Oct. 22, 2021. pp. 1-39.

* cited by examiner

EXCESSIVE TRAIN BRAKE PIPE FLOW DIAGNOSTICS

BACKGROUND OF THE INVENTION

1. Field of the Invention

The present invention relates to train braking systems and, more specifically, to a system and method for monitoring the brake pipe of a train for excessive flow rates while an automatic train brake is being applied.

2. Description of the Related Art

The braking power of a train is typically the subject of strict government requirements that are designed to ensure the safe operation of trains. For example, each train is subjected to a terminal test prior to departure to confirm that the entire braking system is operating properly. In addition, should the braking power of the train fall below a predetermined threshold during a trip, the train must be taken out of service. One problem that may occur is a faulty rail car brake control valve. Leakage from faulty rail car control valves compromise train braking performance as the rail car with the leaky control valve will not respond a brake pipe pressure reduction with the appropriate amount of brake cylinder pressure, thereby not applying the rail car brakes properly. Accordingly, there is a need in the art for an approach for determining and monitoring brake pipe flow to detect and diagnosis braking system problems.

BRIEF SUMMARY OF THE INVENTION

The present invention comprises a brake pipe pressure monitoring system that can evaluate the flow of pressure in the brake pipe and alert the train driver when the brake pipe flow falls crosses a predetermined threshold indicating a compromised operative train brake. More specifically, the brake pipe pressure monitoring system comprises a computer controlled brake including a controller that is programmed to implement at least one brake system input from a train driver. A brake pipe pressure module is associated with the computer controlled brake. A brake pipe pressure transducer is interconnected to the brake pipe pressure module and configured to provide an amount of pressure in a brake pipe coupled to the brake pipe pressure module. A main reservoir pressure transducer is interconnected to the brake pipe pressure module and configured to provide an amount of pressure in a main reservoir coupled to the brake pipe pressure module. A flow transducer is interconnected to the brake pipe pressure module and configured to provide an amount of flow from the main reservoir to the brake pipe to the brake pipe pressure module. The brake pipe pressure module is programmed to calculated and track the flow in the brake pipe over time and to determine whether the flow in the brake pipe over time exceeds a predetermined threshold. The brake pipe pressure module is further configured to cause the computer controlled brake to alert the train driver if the flow in the brake pipe exceeds the predetermined threshold.

In one embodiment, the present invention is a system for monitoring for excessive loss of pressure from a brake pipe of a train, comprising a computer controlled brake having an electro-pneumatic control unit that is programmed to modify an amount of pressure in a brake pipe in response to a user input, a brake pipe pressure flow node associated with the electro-pneumatic control unit, wherein the brake pipe pressure flow node includes a brake pipe pressure transducer configured to provide an amount of pressure in the brake pipe to the brake pipe pressure flow node, a main reservoir pressure transducer configured to provide an amount of pressure in a main reservoir to the brake pipe pressure flow node, and a flow transducer configured to provide an amount of flow in the brake pipe from the main reservoir, wherein the brake pipe pressure flow node is programmed to determine the amount of flow in the brake pipe, to determine whether the flow in the brake pipe exceeds a predetermined threshold, and to cause an indication on a locomotive display to a train driver if the flow in the brake pipe in the brake pipe exceeds the predetermined threshold. The brake pipe pressure flow node may be programmed to determine whether the flow in the brake pipe exceeds the predetermined threshold based on a comparison of the flow in the brake pipe when the brake pipe is in a brakes released pressure state versus a brakes applied pressure state. The brake pipe pressure flow node may be programmed to determine that the flow in the brake pipe is excessive based on whether the flow in the brake pipe with brakes applied minus the flow in the brake pipe with brakes released exceeds the predetermined threshold. The predetermined threshold may represent an amount of flow in the brake pipe that would occur if thirty five percent of all freight car control valves coupled to the computer controlled brake had failed functionality. The brake pipe pressure flow node may be programmed to determine whether the flow in the brake pipe exceeds the predetermined threshold based on whether the flow in the brake pipe in a brakes applied state exceeds the predetermined threshold. The predetermined threshold may represent an amount of brake flow in the brake pipe that would occur if thirty five percent of all freight car control valves coupled to the computer controlled brake had failed.

In another embodiment, the present invention is a method of monitoring a train braking system including a computer controlled brake having an electro-pneumatic control unit that is programmed to modify an amount of pressure in a brake pipe in response to a user input. In a first step, a brake pipe pressure flow node is associated with the electro-pneumatic control unit of the computer controlled brake, wherein the brake pipe pressure flow node includes a brake pipe pressure transducer configured to provide an amount of pressure in the brake pipe to the brake pipe pressure flow node, a main reservoir pressure transducer configured to provide an amount of pressure in a main reservoir to the brake pipe pressure flow node, and a flow transducer configured to provide an amount of flow in the brake pipe from the main reservoir. In another step, the brake pipe pressure flow node is used to determine the amount of flow in the brake pipe. In another step, the brake pipe pressure flow node is used to determine whether the flow in the brake pipe exceeds a predetermined threshold. In another step, the brake pipe pressure flow node is used to provide an indication on a locomotive display to a driver of the train if the flow in the brake pipe in the brake pipe exceeds the predetermined threshold.

BRIEF DESCRIPTION OF THE SEVERAL VIEWS OF THE DRAWING(S)

The present invention will be more fully understood and appreciated by reading the following Detailed Description in conjunction with the accompanying drawings, in which.

DETAILED DESCRIPTION OF THE INVENTION

Figure 1:
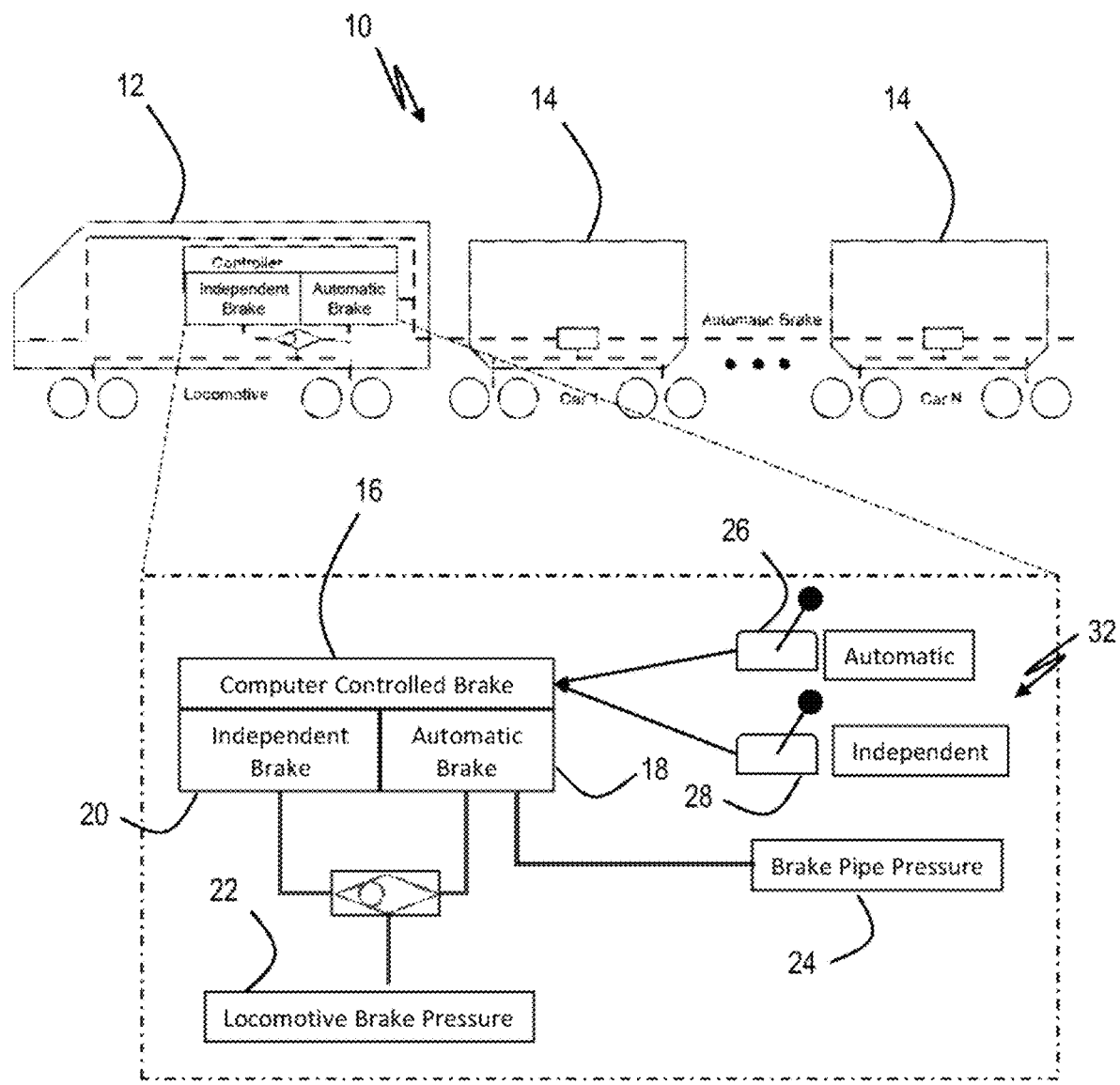
FIG. 1 is a schematic of a locomotive computer controller brake according to the present invention for controlling the braking system of a locomotive and a series of rail cars coupled to the locomotive.

Referring to the figures, wherein like numeral refer to like parts throughout, there is seen in FIG. 1 a train 10 comprising at least one locomotive 12 coupled to a series of rail cars 14. Locomotive 12 includes a computer controlled brake 16 that interfaces with the existing automatic brake 18 and independent brake 20 of the locomotive that controls locomotive brake pressure 22 as well as the brake pipe pressure 24 that signals the application and release of the automatic brakes of rail cars 14 being pulled by locomotive 12. Computer controlled brake 16 is the locomotive equipment used to respond to train driver inputs by executing or commanding the brake settings as selected by the train driver, such as the CCB II® computer controlled brake available from New York Air Brake, LLC of Watertown, New York. As is known in the art, computer controlled brake 16 receives signals generated by the automatic brake handle 26 and the independent brake handle 28 of the electronic brake valve 32 positioned in the cab of locomotive 12 and is responsible for transforming the user handle inputs into brake system commands, such as changes in brake pipe pressure 24 used to selectively apply and release the brakes of the attached rail cars 14 and changes in the locomotive brake pressure 22 used to selectively apply and release the locomotive brakes.

Figure 2:
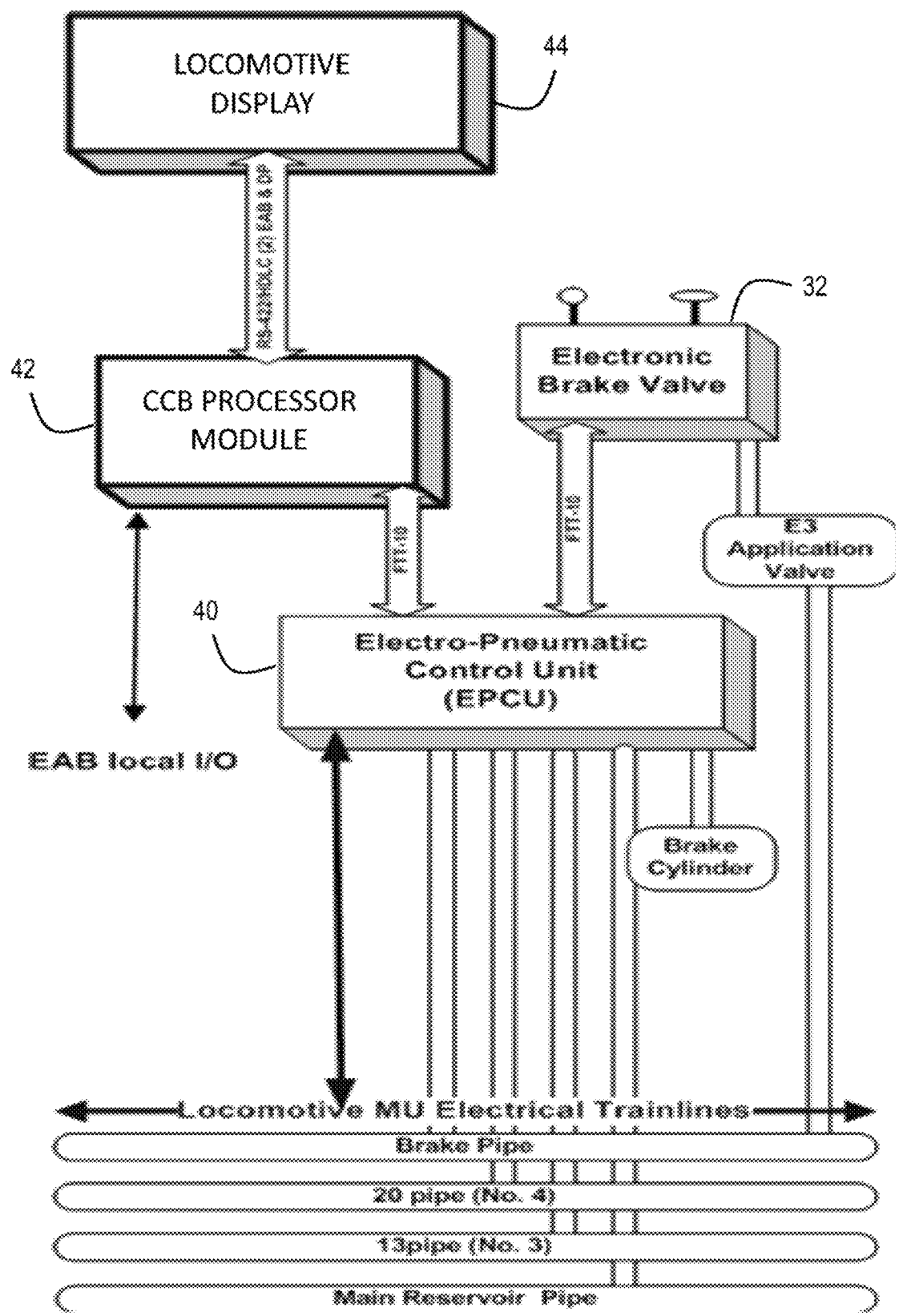
FIG. 2 is a flow diagram of a monitoring system for a computer controller brake according to the present invention.

Referring to FIG. 2, the primary monitoring and control functions of computer controlled brake 16 is accomplished by an electro-pneumatic control unit (EPCU) 40. EPCU 40 manages the pneumatic interfaces of the train braking system and electronic brake valve 32. EPCU 40 is programmed to implement the train driver inputs via the pneumatic and electropneumatic components of computer controller brake 16. For example, EPCU 40 may be programmed with an independent brake application module 34, and an automatic brake application module 36. EPCU 40 also communicates with a CCB processor module 42 that manages the electronic interfaces and interfaces with the user locomotive display 44 located in the cab of locomotive 12, such as a GE® CCA or an EMD® FIRE control system.

Figure 3:
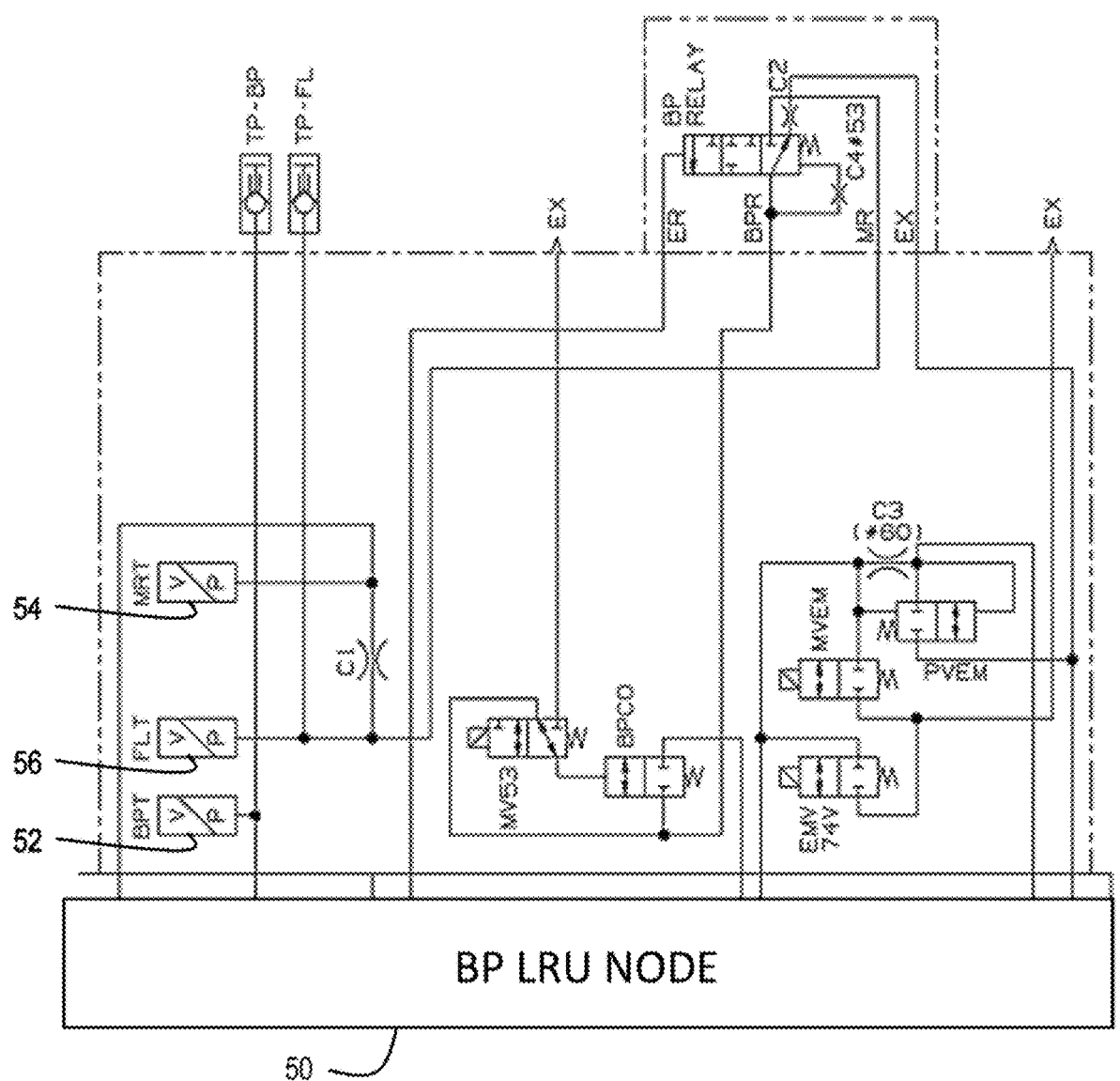
FIG. 3 is a schematic of a monitoring system for a computer controlled brake according to the present invention.

Referring to FIG. 3, the present invention may be implemented in EPCU 40 as a BP LRU node 50. BP LRU node 50 comprises programmable logic that is in communication with the pneumatic components of the train braking system. As seen in FIG. 3, BP LRU node 50 has access to a brake pipe pressure transducer BPT 52, a main reservoir pressure transducer MRT 54, and a flow transducer FLT 56. Using sensors BPT, MRT and FLT, the flow in brake pipe 24 may be calculated and monitored in real-time by BP LRU node 50 with the calculated brake pipe flow tracked over time to identify whether the braking system is operating properly or whether there is a problem that is undermining train braking integrity. Leakage volume is typically measured in cubic feet per minute (CFM), but it should be recognized that units may vary depending on the location.

Figure 4:
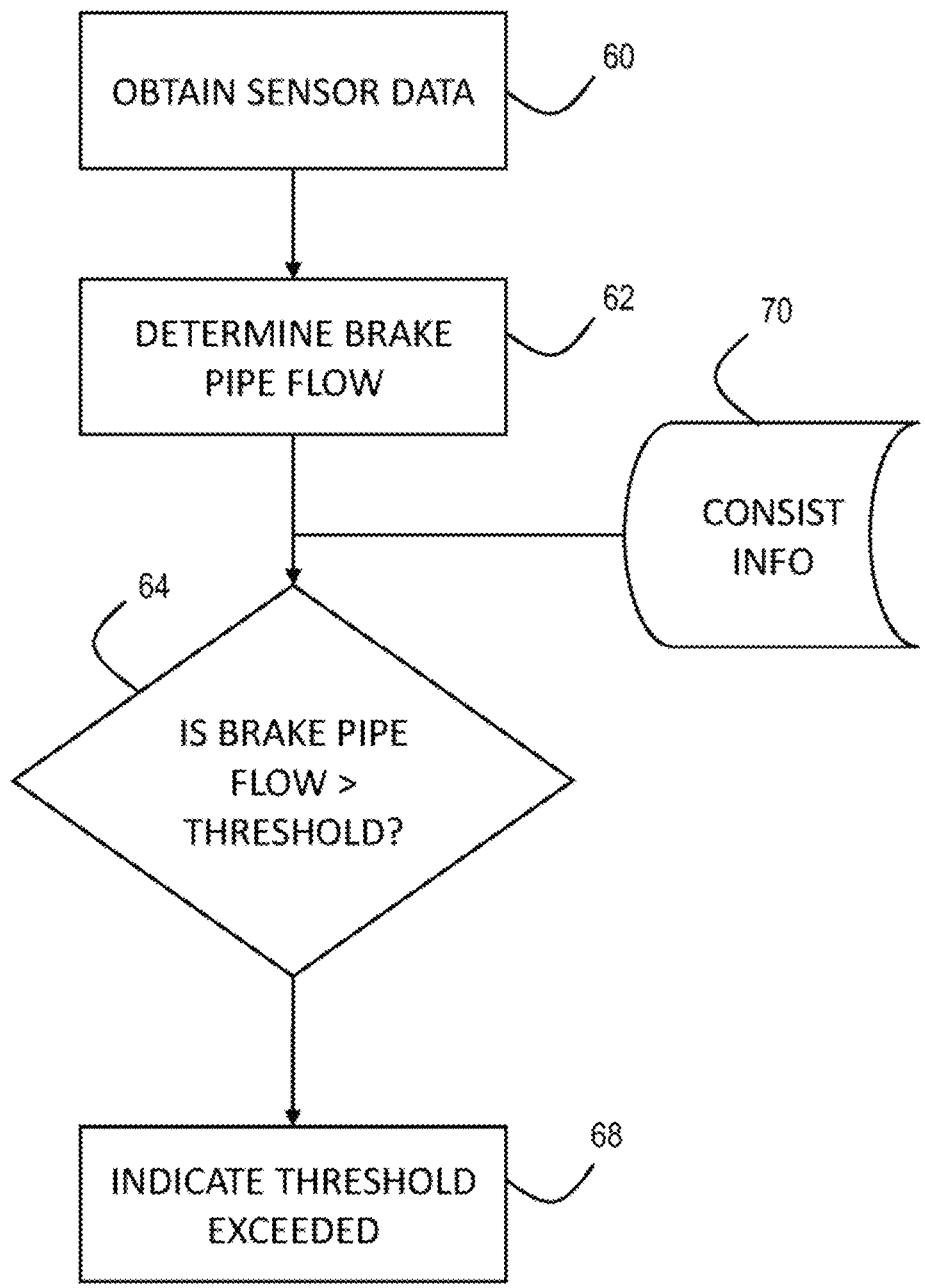
FIG. 4 is a flowchart of excessive brake pipe flow determination according to the present invention.

Referring to FIG. 4, BP LRU node 50 can retrieve sensor data 60 from brake pipe pressure transducer BPT 52, main reservoir pressure transducer MRT 54, and flow transducer FLT 56. The retrieved data is then used to determine brake pipe flow 62. The calculated brake pipe flow is then checked 64 to determine whether it exceeds a predetermined threshold, thereby indicating excessive leakage. If check 64 indicates excessive leakage, an indication is made 68, such as an alert or alarm provided to the user via the user display. Thus, BP LRU node 50 is programmed to identify a brake pipe flow rate that exceeds a predetermined threshold as indicative of an excessive brake pipe flow rate and to identify the user of the excessive brake pipe flow condition.

As explained above, BP LRU node 50 may be programmed to determine excessive brake pipe flow EBPF by using a predetermined threshold (identified as X). Threshold X may be set according to railroad regulations or to any user defined lever that is to be used to provide an indication of excessive flow. For example, a brake pipe leakage flow rate that is equivalent to 35 percent of freight car valves exhibiting failed functionality is recognized in some jurisdictions as the appropriate level for meeting regulations. Thus, in a 120 car train, the brake pipe leakage flow rate that is equivalent to 42 of out 120 cars having failed functionality may be used as the threshold for determining excessive leakage. The flow in the brake pipe may be evaluated in both the brakes released state (pre-brake application with brake pipe at standard pressure) and the brakes applied state (brakes applied via an appropriate brake pipe pressure reduction).

The number of cars in a train may be determined on a case-by-case basis as specific consist information can be input for each train 10 prior to departing a terminal for a given route, or retrieved from an on-board system that has been programmed with the current train configuration, such as a train control system located in the cab of locomotive 12. Thus, in the approach seen in FIG. 4, consist info 66 may be retrieved for determining the threshold applied in check 64. For example, BP LRU node 50 may be programmed to determine excessive brake pipe flow (EBPF) in check 64 based on one or more predetermined conditions, such as:

$$EBPF = \text{Applied Brake Pipe Flow} - \text{Pre-Application } BP \text{ Flow} > (X) \quad 1.$$

Or $$EBPF = \text{Applied Brake Pipe Flow} > 60 \text{ CFM} + (X) \quad 2.$$

The results of an excessive brake pipe flow determination, or a real-time indication of whether current brake pipe flow is excessive, may be indicated for a user via CCB processor module 42 so that the results are provided on the user display 44 located in the cab of locomotive 12.

As described above, the present invention may be a system, a method, and/or a computer program associated therewith and is described herein with reference to flowcharts and block diagrams of methods and systems. The flowchart and block diagrams illustrate the architecture, functionality, and operation of possible implementations of systems, methods, and computer programs of the present invention. It should be understood that each block of the flowcharts and block diagrams can be implemented by computer readable program instructions in software, firmware, or dedicated analog or digital circuits. These computer readable program instructions may be implemented on the processor of a general purpose computer, a special purpose computer, or other programmable data processing apparatus to produce a machine that implements a part or all of any of the blocks in the flowcharts and block diagrams. Each block in the flowchart or block diagrams may represent a module, segment, or portion of instructions, which comprises one or more executable instructions for implementing the specified logical functions. It should also be noted that each block of the block diagrams and flowchart illustrations, or combinations of blocks in the block diagrams and flowcharts, can be implemented by special purpose hardware-based systems that perform the specified functions or acts or carry out combinations of special purpose hardware and computer instructions.

What is claimed is:

1. A system for monitoring for excessive loss of pressure from a brake pipe of a train, comprising:
   a computer controlled brake having an electro-pneumatic control unit that is programmed to modify an amount of pressure in a brake pipe in response to a user input;
   a brake pipe pressure flow node associated with the electro-pneumatic control unit, wherein the brake pipe pressure flow node includes a brake pipe pressure transducer configured to provide an amount of pressure in the brake pipe to the brake pipe pressure flow node, a main reservoir pressure transducer configured to provide an amount of pressure in a main reservoir to the brake pipe pressure flow node, and a flow transducer configured to provide an amount of flow in the brake pipe; and
   wherein the brake pipe pressure flow node is programmed to determine the amount of flow in the brake pipe, to determine whether the flow in the brake pipe exceeds a predetermined threshold, and to cause an indication on a locomotive display to a train driver if the flow in the brake pipe exceeds the predetermined threshold.

2. The system of claim 1, wherein the brake pipe pressure flow node is programmed to determine whether the flow in the brake pipe exceeds the predetermined threshold based on a comparison of the flow in the brake pipe when the brake pipe is in a brakes released pressure state versus a brakes applied pressure state.

3. The system of claim 2, wherein the brake pipe pressure flow node is programmed to determine that the flow in the brake pipe is excessive based on whether the flow in the brake pipe with brakes applied minus the flow in the brake pipe with brakes released exceeds the predetermined threshold.

4. The system of claim 3, wherein the predetermined threshold represents an amount of flow in the brake pipe that would occur if thirty five percent of all freight car control valves coupled to the computer controlled brake had failed functionality.

5. The system of claim 1, wherein the brake pipe pressure flow node is programmed to determine whether the flow in the brake pipe exceeds the predetermined threshold based on whether the flow in the brake pipe in a brakes applied state exceeds the predetermined threshold.

6. The system of claim 5, wherein the predetermined threshold represents an amount of brake flow in the brake pipe that would occur if thirty five percent of all freight car control valves coupled to the computer controlled brake had failed.

7. A method of monitoring a train braking system including a computer controlled brake having an electro-pneumatic control unit that is programmed to modify an amount of pressure in a brake pipe in response to a user input, comprising the steps of:
   associating a brake pipe pressure flow node with the electro-pneumatic control unit of the computer controlled brake, wherein the brake pipe pressure flow node includes a brake pipe pressure transducer configured to provide an amount of pressure in the brake pipe to the brake pipe pressure flow node, a main reservoir pressure transducer configured to provide an amount of pressure in a main reservoir to the brake pipe pressure flow node, and a flow transducer configured to provide an amount of flow in the brake pipe;
   using the brake pipe pressure flow node to determine the amount of flow in the brake pipe;
   using the brake pipe pressure flow node to determine whether the flow in the brake pipe exceeds a predetermined threshold; and
   providing an indication on a locomotive display to a driver of the train if the flow in the brake pipe in the brake pipe exceeds the predetermined threshold.

8. The method of claim 7, wherein the brake pipe pressure flow node determines whether the flow in the brake pipe exceeds the predetermined threshold based on a comparison of the flow in the brake pipe when the brake pipe is in a brakes released pressure state versus a brakes applied pressure state.

9. The system of claim 8, wherein the brake pipe pressure determines that the flow in the brake pipe is excessive based on whether the flow in the brake pipe with brakes applied minus the flow in the brake pipe with brakes released exceeds the predetermined threshold.

10. The system of claim 9, wherein the predetermined threshold represents an amount of brake in the brake pipe that would occur if thirty five percent of all freight car control valves coupled to the computer controlled brake had failed functionality.

11. The system of claim 7, wherein the brake pipe pressure flow node determines whether the flow in the brake pipe exceeds the predetermined threshold based on whether the flow in the brake pipe in a brakes applied state exceeds the predetermined threshold.

12. The system of claim 11, wherein the predetermined threshold represents an amount of flow in the brake pipe that would occur if thirty five percent of all freight car control valves coupled to the computer controlled brake had failed functionality.

* * * * *